United States Patent [19]

Kamenski

[11] 3,873,369

[45] Mar. 25, 1975

[54] TUNGSTEN OXIDE-CONTAINING CATHODE FOR NON-AQUEOUS GALVANIC CELL

[75] Inventor: Karl F. Kamenski, Deepwater, N.J.

[73] Assignee: E. I. du Pont de Nemours and Company, Wilmington, Del.

[22] Filed: May 14, 1973

[21] Appl. No.: 360,937

[52] U.S. Cl.......... 136/83 R, 136/100 R, 136/120 R
[51] Int. Cl. ......................................... H01m 17/02
[58] Field of Search ..... 136/6 LN, 20, 83 R, 100 R, 136/120 R, 120 FC, 137, 154, 155; 204/291

[56] References Cited
UNITED STATES PATENTS

| | | | |
|---|---|---|---|
| 3,043,896 | 7/1962 | Herbert et al. | 136/6 LN |
| 3,410,731 | 11/1968 | Rightmire et al. | 136/100 R |
| 3,424,621 | 1/1969 | Rogers | 136/83 R X |
| 3,507,701 | 4/1970 | Broyde | 136/120 FC X |
| 3,658,592 | 4/1972 | Dey | 136/6 LN |
| 3,726,716 | 4/1973 | Athearn et al. | 136/100 R |

*Primary Examiner*—Anthony Skapars
*Attorney, Agent, or Firm*—James A. Costello

[57] ABSTRACT

Disclosed herein is a tungsten oxide-containing cathode whose cathodically active material comprises $WO_x$, wherein $X$ is between about 2.0 to 2.9; the cathode being useful in a high energy density cell comprising additionally, among other things, a light metal anode, and a nonaqueous organic liquid electrolyte.

10 Claims, No Drawings

TUNGSTEN OXIDE-CONTAINING CATHODE FOR NON-AQUEOUS GALVANIC CELL

BACKGROUND OF THE INVENTION

1. Field of the Invention

This invention concerns cathodes for high energy density cells containing certain lower oxides of tungsten.

2. Description of the Prior Art

The principal reason for commercial development of high energy density batteries is to provide a large amount of energy per unit volume and per unit weight of battery. New and more acceptable applications can be made of batteries of this type in cameras, hearing aids, small appliances, radios and many miniature devices. Since the principal point is the providing of energy, disclosures of the use of specific metal compounds as cathodes have almost universally recommended their use in high state of oxidation. Patents are thus directed to such as cupric sulfide, cupric chloride and thallic oxide. Theoretically, more energy is provided from a couple comprising a higher oxidized form than from a lower oxidized form of metal oxide.

Batteries used in cameras, for photo-flash initiation and to energize film advancement, focus adjustment and the like must be able to provide high current for a relatively short time, with quick recovery during an off period so that adequate current can be supplied for the next drain period. This kind of use can be termed "pulse discharge." For a home snapshot camera it has been found that a battery providing a minimum of 4 volts under load is desirable to furnish adequate power for normal requirements. A battery of two cells, say, each of at least 2.0 volts is desirable but not readily available. For instance, the practical application of the lithium-cupric sulfide couple gives cells having voltage under load of 1.7, and three such cells would be required for a 4 volt battery.

There is a need then for a cell capable of providing at least about 2.0 volts in pulse discharge in high drain applications, and the voltage must be maintained through a number of pulses. Also, the cell should have long shelf life, e.g. at least 6 months, and there should be good conductivity between active material and current collector and tolerance for flexing without an undesirable effect on performance.

Ideally, the cathodically active material will be conductive, or will require only small amounts of a conductivity aid. Cells which employ the cathodes of this invention have been found to fulfill all the requirements set out above and, furthermore, can be fabricated in a very thin, light, flat form.

Broyde, in U.S. Pat. No. 3,507,701, discloses tungsten oxide as a catalyst in the cathode of an aqueous-electrolyte fuel cell. Rightmire et al., in U.S. Pat. No. 3,410,731, disclose tungsten oxide in an electrode employed in an electrical energy storage device of the fused salt electrolyte type, said tungsten oxide having an oxygen content of less than is present in $WO_2$. Herbert et al., in U.S. Pat. No. 3,043,986, disclose that the higher oxides of tungsten are stable in the presence of amines and provide a large energy output relative to their weight.

SUMMARY OF THE INVENTION

In a high energy density galvanic cell having a cathode containing cathodically active material, a light metal anode from Group IA or IIA of the Periodic Table, and a nonaqueous organic liquid electrolyte, the improvement which comprises, a cathode wherein the cathodically active material comprises $WO_x$, wherein $x$ is between about 2.0 to 2.9.

The cathodes of this invention will derive special benefit from whatever portion of the cathodically active material is the tungsten oxide, $WO_{2.0-2.9}$, taught herein. The cathodes will provide high voltages and other characteristics of the tungsten oxide in proportion to the amount thereof that is present. Consequently, it is preferred that the cathodes contain large amounts of tungsten oxide as the cathodically active material. For example, cathodes containing more than about 50% $WO_{2.0-2.9}$ as the active material are preferred. Especially preferred are cathodes containing about 100% tungsten oxide as the active material. For most applications, the tungsten oxide component of the active material should exceed about 10% for its presence to be significantly appreciated.

For a cell of the highest energy density, it is preferred that the electrolyte have a conductivity at room temperature of at least $1 \times 10^{-4}$ ohm$^{-1}$ cm$^{-1}$, that the anode be lithium, and that the cathode material be about 100% tungsten oxide having a stoichiometry indicated by $WO_{2.7}$.

Depolarizers reducible by lithium metal are contemplated as the cathodically active material employable with the $WO_{2.0-2.9}$. Any such element or compound lower in the scale of reduction potential than lithium can be used. Of course, considerations of cost, corrosiveness, etc. may make the use of some such depolarizers impractical. Representative of suitable cathode depolarizers are carbon fluoride and the oxides, chlorides, fluorides, sulfides, phosphates, sulfates and chromates of metals such as iron, copper, nickel, silver, lead and vanadium.

In addition to the cathodically active material, the "cathodes" of this invention can include, optionally, a conductivity aid and/or a binder. When conductivity aids are employed in addition to the cathodically active material, they are preferably, though not necessarily, kept at levels of 5% or less based on the weight of the active material. Amounts thereof in excess of about 5% tend to lessen cell capacity. Representative conductivity aids include carbon, graphite, copper, iron and lead (powders).

The term "cathode" also includes a binder which can be employed as an aid to help bind the particles of active material together and to help bind the active material to the conductive substrate employed as the current collector. Those skilled in the art will have no trouble choosing such binders which include, among others, polytetrafluoroethylene, polyethylene, polystyrene and the like. Such binders are effective in amounts of up to about 15% by weight of the active material.

Preferred binders, also effective in amounts of up to about 15%, are carboxymethylcellulose, hydroxyethylcellulose, polyvinyl alcohol, soluble starch, casein and gelatin. These binders are the subject of a coassigned patent application, filed on May 14, 1973, bearing U.S. Ser. No. 360,939.

DETAILS OF THE INVENTION

Surprisingly, it has been found that tungsten oxides of the formula $WO_x$, where x is from about 2.0 to 2.9, are more satisfactory as an active cathode material than the most highly oxidized tungsten oxide, $WO_3$. Performance of cells having a cathode as described herein vis-a-vis a consistently high voltage output when subjected to pulse discharge under high drain conditions, is greatly superior to that of cells having $WO_3$ cathodes.

Brown tungsten oxide, $WO_2$, can be made by heating alkali-free tungsten trioxide with 10% to 20% of its weight of glycerol or ethylene glycol and carbon in a covered crucible at dull red heat. Alternatively, it can be formed by heating tungsten diiodide to 500° C. in a current of carbon dioxide.

Blue tungsten oxide can be prepared by heating pure tungsten powder and pure tungsten trioxide, $WO_3$, in the ratio $WO_{2.72}$ for 6 hours at 800° C. in an evacuated and sealed quartz tube. Other tungsten oxides can be prepared by oxidizing $WO_2$ or by reducing $WO_3$ as will be understood by those skilled in the art. A typical reduction reaction would be to heat the trioxide in a stream of hydrogen at 250° to 300° C.

Performance of the disclosed tungsten oxides can sometimes be improved by washing with water to remove soluble inorganic salts. The available commercial products have performed satisfactorily in numerous test cells, but for cells where small variations in cell impedance is critical, washing the oxide with water may solve the problem.

Fabrication of cathodes incorporating the disclosed tungsten oxides as active ingredient can be performed in almost any manner contemplated for other, art-known, active solid cathode materials reducible by lithium or other light metals and chemically unreactive with the other cell components. For instance, dry powders of active materials can be deposited in the interstices of a conductive metal grid which is passed through spaced pressure rollers. The active material is thus bonded or locked into the grid. Another method is to print a paste of cathode material and volatile solvent onto a carrier sheet, after which the volatile solvent is evaporated.

Tungsten oxide can be pressed into a conductive screen of expanded metal and formed into a cathode for use in coiled cells, or, it can be slurried in a volatile liquid and painted or sprayed on a conductive, relatively soft (lead, iron, copper, aluminum) metal sheet and then dried before use. Optionally, after drying, the active material can be pressed into the metal sheet substrate at 5,000 to 50,000 pounds per square inch pressure.

The Rest of the Cell Components

The following disclosure presents some typical cell components which can be employed together with the novel cathodes taught herein.

The tungsten oxide cathodes can be used in cells of varying configuration, including coiled electrode or "jelly-roll" cells as disclosed in U.S. Pat. No. 2,536,699, pleated cells as disclosed in U.S. Pat. No. 3,663,721, and round cells as disclosed in U.S. Pat. No. 3,413,154. In fact, any convenient configuration can be employed wherein a suitable anode is in spaced relationship from the metal oxide cathode and both are in mutual contact with a conductive nonaqueous electrolyte. With suitable current collectors from anode and cathode, electric current is obtained from the cell through an external circuit.

The invention is applicable to primary cells utilizing (1) light metal anodes of lithium, sodium, potassium, aluminum, magnesium, calcium and beryllium; (2) nonaqueous electrolytes having a conductivity of at least $1 \times 10^{-4}$ $ohm^{-1}$ $cm^{-1}$. Among the nonaqueous solvents useful in the cells of the invention are tetrahydrofuran, dimethyl carbonate, propylene carbonate, 1,3-dioxolane, 4-methyl-1,3-dioxolane, dimethoxyethane, dimethyl formamide, trimethyl carbamate, ethyl-N,N-dimethyl carbamate, and the dimethyl ether of diethylene glycol.

The electrolyte solvent must be nonreactive with the other cell components, including the active metal anode and the cathode material. A preferred electrolyte is one incorporating 1,3-dioxolane or a substituted dioxolane as primary solvent, as indicated below.

Broadly, a nonreactive electrolyte salt is present in the electrolyte solvent, which can be dioxolane or substituted dioxolane, having the formula

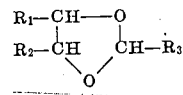

wherein $R_1$, $R_2$ and $R_3$ are the same or different and are hydrogen or alkyl of one to three carbon atoms, with the limitation that the total number of carbon atoms in $R_1$, $R_2$ and $R_3$ does not exceed six. Preferred electrolyte solvents are those of the above formula in which $R_1$ and $R_3$ are hydrogen and $R_2$ is hydrogen or methyl. The most preferred solvent because of its highest performance is dioxolane, i.e., the compound of the above formula in which $R_1$ and $R_2$ and $R_3$ are all hydrogen.

The electrolyte salt is present in sufficient concentration to provide a conductivity at 25° C. of at least $1 \times 10^{-4}$ $ohm^{-1}$ $cm^{-1}$ and can be present in amounts ranging up to the saturation value. It is generally preferred to avoid a saturated solution because upon cooling the battery, sufficient salt may precipitate to interfere with battery function. Therefore, electrolytes usually consist of from about 5% to 30% by weight of salt and from about 95% to 70% by weight of solvent. A preferred combination consists of about 10% by weight of $LiClO_4$ and about 90% by weight of dioxolane. The $LiClO_4$-dioxolane system is not only highly conductive but also essentially nonreactive with lithium metal.

It is sometimes advantageous to utilize in addition to a dioxolane as the primary solvent, a secondary solvent such as an aliphatic or cycloaliphatic carbohydric ether having a molecular weight no greater than about 165. Representative of such secondary solvents are cycloaliphatic carbohydric ethers other than dioxolane composed of carbon, hydrogen and oxygen and having five to six members including one oxygen atom or two nonadjacent oxygen atoms in the ring such as ethylene oxide, propylene oxide, butylene oxide, dioxane, tetrahydropyran, dihydrofurane, and tetrahydrofurane.

Other secondary solvents are aliphatic ethers characterized by the formula $RO-(CH_2CH_2O)_n R$ where $n$ is 0, 1 or 2, preferably where R is methyl or ethyl and $n$ is 1 or 2. Representative of such aliphatic ethers are diethyl ether, 1,2-dimethoxyethane, 1,2-diethoxyethane, the dimethyl ether of diethylene glycol and the diethyl ether of diethylene glycol. Preferred are the 1,2-dimethoxyethane and the dimethyl ether of diethylene glycol. The secondary solvent tends to reduce the amount of gas formed in a battery during discharge. The amount of such secondary solvent can range up to about 1:1 weight ratio with the dioxolane. The concentration ranges for the salt in such binary solvent are the same as those for a dioxolane alone, with about 10% by weight LiClO$_4$ and about 90% by weight of 1:1 binary solvent most preferred. Amounts of up to about 2% by weight of other solvents can also be used in the solvent mixture to promote the properties described above. Such solvents include methyl acetate, propylene carbonate, dimethyl carbonate and others.

A tertiary nitrogen base such as dimethylisoxazole, pyridine or triethylamine can also be added to the electrolyte solvent in amounts of less than 10% by weight and preferably from about 0.1% to 1% by weight to suppress the tendency of the electrolyte system to form polymer.

A large number of electrolyte salts are useful in these electrolytes. Such salts must have sufficient solubility and dissociation to provide conductivity of at least $1 \times 10^{-4}$ ohm$^{-1}$ cm$^{-1}$ in the electrolyte solution. Generally, the more useful salts are those with cations chosen from groups IA and IIA of the Periodic Table. The most useful salts are those wherein lithium, sodium, potassium or alkyl-ammonium are the cations. In addition to simple halogen salts many complex salts are useful, including tetrafluoroborates, hexafluorophosphates, hexafluoroarsenates, tetrachloroaluminates, and perchlorates. Also useful are salts of trichloroacetic acid, trifluoroacetic acid and trifluoromethanesulfonic acid. As indicated above, the most preferred salt is LiClO$_4$.

It is possible to design special "power packs" which are capable for example, of delivering high voltage at various current densities to meet requirements for the operation of portable radios, tape recorders and movie cameras. To demonstrate this, several cells were discharged under different loads. Both the discharge voltage and cathode utilization (to 1.5 volt cutoff) were constant, even after a twentyfold increase in current delivery.

DESCRIPTION OF THE PREFERRED EMBODIMENTS

The following Examples are meant to illustrate and not to limit the scope of this invention. All percentages are by weight unless indicated to the contrary. Blue tungsten oxide can be defined by x-ray diffraction measurements where it exhibits a pattern closely corresponding to those patterns which have a stoichiometry equivalent to WO$_{2.7}$ to WO$_{2.9}$.

It will be exceedingly obvious to anyone skilled in the art how to construct cells containing the cathodically active tungsten oxides taught herein, at it will be obvious how to employ said cells once they are made. For the sake of completeness, however, a summary discussion is presented for making one type of cell, a round button cell. It is noted that the shape of the cell and the shape of the cathode can vary as needed and this invention is not particularly concerned with any particular shape or size thereof. A typical buttontype cell is made in the following manner: circular metal cups about 1.15 inches in diameter with sides upstanding about 0.25 inch are stamped from 0.025 inch sheet steel. Inside the cup, and fitted closely, is placed a plastic insulator ring, a lithium disc, a nonconductive bibulous separator and a disc-shaped cathode. The electrolyte is added and a top is placed on the edge of the insulator ring. The upstanding sides are bent over and down on the insulator ring, holding and pressing against the top and forcing the metal top against the cathode inside the cell.

EXAMPLE 1

A. Commercial tungsten oxide having the analysis, WO$_{2.7}$, was slurried in water at about 40%/60% proportion and painted onto a piece of lead foil 2 inches square and about 8 mils thick. The coated foil was dried for about ½ hour at 50° C. then cold pressed on a bench press at 20,000 lbs/sq. inch for 5 minutes. A section of the pressed sheet was assembled into a galvanic cell of "button" configuration utilizing 8 mil thick lithium sheet as anode, a ceramic, nonconductive separator about 5 mils thick, an electrolyte composed of 68% dioxolane, 16 ½% lithium perchlorate, and 15% ethylene glycol methyl ether and ½% dimethylisoxazole.

B. A second cell was prepared using the same tungsten oxide. The oxide was washed in deionized water and dried in an oven at 50° C., then slurried in a mixture of 60 parts 1,1,2,2-tetrachloro-1,2-difluoroethane and 40 parts of 1,1,2-trichloro-1,2,2-trifluoroethane and the slurry painted onto 8 mil thick lead foil. The coated foil was dried at 50° C. to drive off the lower boiling trichlorotrifluoroethane then cold pressed for about 5 minutes on a bench press at 40,000 lbs./sq. in. and further dried at 120° C. to drive off the higher boiling tetrachlorodifluoroethane, thus giving a somewhat porous cathode structure.

A button type galvanic cell was prepared employing the above prepared cathode along with a lithium anode, a nonconductive separator and an electrolyte composed of 68% 1,3-dioxolane, 15% ethylene glycol dimethyl ether, ½% 4,5-dimethylisoxazole and 16 ½% lithium perchlorate.

When these cells were discharged pulsewise through 9 ½ ohms resistance (1.1 seconds on, then 3.0 seconds off), the data of Table 1 were obtained. "Open Circuit Voltage" was measured on freshly prepared, undischarged cells. The data show a very satisfactory voltage level under repetitive discharge conditions.

TABLE 1

Room Temperature Discharge Performance

| Cell | Open Circuit Voltage | 1st Pulse | 11th Pulse |
|---|---|---|---|
| A | 2.80 volts | 2.15 volts | 2.07 volts |
| B | 2.79 volts | 2.17 volts | 2.13 volts |

EXAMPLE 2

A cell was prepared as in Example 1(B) except that an intimate mixture containing 57% of the tungsten oxide and 43% tungsten carbide was washed, dried and compressed on lead to form the cathode. A button cell was prepared from the cathode with the other ingredients the same as in 1(B), and its performance compared to a second cell prepared exactly as 1(B). The discharge comparison was made at 0° C. with other conditions as in Example 1. The data are shown in Table 2, and indicate very good low temperature performance.

TABLE 2

| | 0°C. Discharge Performance | | |
|---|---|---|---|
| | Open Circuit Voltage | 1st Pulse | 11th Pulse |
| Example 2 Cathode | 2.71 | 2.18 | 2.10 |
| Example 1(B) Cathode | 2.75 | 1.96 | 1.90 |

EXAMPLE 3

Each of the following cathodes, A, B, C, and D, was found satisfactory for use in high energy density cells. Cathodes B, C, and D contained no conductivity aids.

A. A mixture of 2.0 grams of blue tungsten oxide and 0.04 gram of finely divided conductive carbon was slurried in the chlorofluorocarbon mixture of Example 1(B), dried and pressed on 8 mil lead foil as in that Example. Resistance was $8 \times 10^{-3}$ ohms. This cathode was employed in a galvanic cell with the other components the same as in Example 1(B) and tested by pulse discharge at 0° C. through 9 ½ ohms resistance (1.1 seconds on, then 3.0 seconds off). The first pulse gave 2.10 volts and the 11th pulse gave 2.01 volts.

B. A cathode was prepared as in Example 1(A), using blue tungsten oxide on 8 mil thick lead foil. Resistance was $24 \times 10^{-3}$ ohms.

C. A mixture of 3 grams of blue tungsten oxide and 3.0 grams of lead powder was slurried in the chlorofluorocarbon mixture of Example 1(B), dried and pressed on 8 mil thick lead foil as in that example. Resistance was $8 \times 10^{-3}$ ohms.

D. A mixture of 12.0 grams of blue tungsten oxide and 1.5 grams of copper powder was processed and formed into a cathode on 8 mil lead foil as before. Resistance was $6.5 \times 10^{-3}$ ohms.

EXAMPLE 4

A mixture of 2.69 grams of blue tungsten oxide and 1.0 gram of cupric sulfide was washed, dried and painted on 8 mil lead foil, then pressed as in Example 1(B). Electrical resistance was $70. \times 10^{-3}$ ohms. A button cell was prepared using this cathode and other materials as in Example 1(B). Open circuit voltage for this cell was 2.7 volts, while 1st pulse voltage under load was 2.11 and 11th pulse voltage 2.0.

EXAMPLE 5

Ten grams of blue tungsten oxide was sifted through a 325 mesh screen and then combined with 0.5 gram of finely divided conductive carbon and 0.5 gram of sodium carboxymethylcellulose binder. The combination was coated smoothly onto a steel plate 1.5 mils thick and about 5 inches long by 4 inches wide. The coated plate was dried at 80° C. and atmospheric pressure, then placed in a vacuum oven at 140° C. for 3 hours. The dry cathode was then rolled through steel rollers for one pass to smooth the surface.

Resistance of the cathode, which had a total thickness of 4.5 mils, was $20 \times 10^{-3}$ ohms. Sections of the cathode were employed in five button cells with lithium anodes and separator and electrolyte as in Example 1(B). The cells were tested by pulsing under 9.5 ohms drain (1.1 seconds on, then 3.0 seconds off), giving the data shown in Table 3. The data show consistency of performance and excellent maintenance of that performance at low temperature.

TABLE 3

| Cell | Discharge Temp. | 1st Pulse | 11th Pulse |
|---|---|---|---|
| A | 25°C. | 2.41 | 2.30 |
| B | 25°C. | 2.39 | 2.30 |
| C | 25°C. | 2.40 | 2.30 |
| D | 25°C. | 2.31 | 2.18 |
| E | 0°C. | 2.27 | 2.13 |

EXAMPLE 6

(FOR COMPARATIVE PURPOSES)

Forty grams of yellow tungsten oxide, $WO_3$, was combined with 0.816 gram of sodium carboxymethylcellulose binder. The mixture was blended in a high shear mixer, then coated onto several 2.4 inch × 3.5 inch steel plates 1.5 mils thick. After air drying at about 50° C., the coated plates were dried in a vacuum oven at 140° C. The cathode selected for test was 7.0 mils thick including the 1.5 mil thick steel plate, and weighed 2.82 grams. Its resistance was $2.1 \times 10^3$ ohms.

A second cathode was prepared in the same manner but substituting blue tungsten oxide for the yellow tungsten oxide. Its resistance was $25 \times 10^{-3}$.

Two flat cells were prepared from the two cathodes using lithium anodes and the same composition of electrolyte used in Example 1(B). The cells were tested by pulsing at room temperature under 1.6 ohms load as described before (1.1 seconds on, then 3.0 seconds off). Results are shown in Table 4.

TABLE 4

| Cell Cathode | Open Circuit Voltage | 1st Pulse | 11th Pulse |
|---|---|---|---|
| Yellow tungsten oxide | 2.8 volts | 1.45 volts | 0.74 volts |
| Blue tungsten oxide | 2.5 volts | 2.15 volts | 2.15 volts |

When cells employing yellow and blue tungsten oxide with anodes and electrolyte as above were compared under a 50 ohm load and continuous discharge, the data of Table 5 were obtained.

TABLE 5

| | Voltage at Time Intervals | | | |
|---|---|---|---|---|
| Cell Cathode | 1 min. | 2 min. | 4 min. | 6 min. |
| Yellow tungsten oxide | 1.70 | 1.25 | 1.02 | 0.95 |
| Blue tungsten oxide | 2.55 | 2.50 | 2.45 | 2.43 |

EXAMPLE 7

This Example illustrates the excellent performance of the blue tungsten oxide cathodes without any conductivity aid (A) in comparison to a cathode incorporating such an aid, conductive carbon, (B).

A. A 4.0 gram portion of blue tungsten oxide powder that had been passed through a 325 mesh screen was cold pressed in a circular die at 40,000 psig using a laboratory bench press. The resultant cathode disc was 52 mils thick and had a surface area of 6.78 square centimeters. It weighed 3.92 grams and had an electrical resistance of 450 × 10⁻³ ohms. After pressing, the cathode disc was dried at 180° C. for 2 hours.

B. A combination of 97 parts blue tungsten oxide, 2 parts of sodium carboxymethylcellulose binder and 1 part finely divided conductive carbon was dried at 60° C. The dried material was pulverized and passed through a 325 mesh screen, then pressed and dried as in Part A. There resulted a cathode disc 45 mils thick with surface area of 6.78 square centimeters. It weighed 2.70 grams and had an electrical resistance of 350 × 10⁻³ ohms.

The 2 cathodes from A and B were assembled into button cells with lithium anodes, paper separators and an electrolyte containing 20% lithium perchlorate, 65.1% 1,3-dioxolane, 14.4% ethylene glycol dimethyl ether and 0.5% 4,5-dimethylisoxazole. The two cells were compared by pulsing under a 9.6 ohm load (1.1 seconds on, 3 seconds off) at room temperature with results shown in Table 6.

TABLE 6

|  | 1st Pulse | 11th Pulse |
|---|---|---|
| Cell of Cathode A | 2.20 volts | 2.16 volts |
| Cell of Cathode B | 2.25 volts | 2.25 volts |

The same cells were then tested by discharging continuously under 100 ohms load with results shown in Table 7.

TABLE 7

|  | 1 min. | 2 min. | 4 min. | 6 min. | 8 min. |
|---|---|---|---|---|---|
| Cell of Cathode A | 2.60 | 2.57 | 2.54 | 2.50 | 2.50 |
| Cell of Cathode B | 2.60 | 2.57 | 2.55 | 2.55 | 2.54 |

EXAMPLE 8

In 30 ml. of deionized water there was dissolved 1.0 gram of sodium carboxymethylcellulose binder and to the solution were added 0.5 gram of finely divided carbon and 48.5 grams of brown tungsten oxide, $WO_2$. The mixture was agitated in a high shear mixer for about 10 minutes, then coated onto several 2.4 inch by 3.1 inch steel plates of 1.5 mil thickness. The coated plates were air dried at about 50° C., then dried in a vacuum oven at 140° C. The finished cathode plates so prepared were about 6.0 mils thick and weighed 3.0 grams. The direct current electrical resistance was about 2.6 × 10⁻³ ohms. Flat cells were prepared with these cathodes, using lithium plate anodes, paper separators and the same electrolyte employed in Example 7.

When tested at room temperature by pulse discharge (1.1 seconds on, 3.0 seconds off) through a 1.6 ohm load, the 1st pulse gave 2.15 volts and the 11th pulse 1.98 volts. When tested by continuous discharge under a 50 ohm load the cell gave 2.45 volts after one minute and 2.05 volts after 12 minutes.

EXAMPLE 9

Blue tungsten oxide was employed as the active cathode material in a cell employing a lithium anode and an electrolyte compound of 63% tetrahydrofuran, 27% dimethoxyethane and 10% lithium perchlorate. The cell had an active electrode surface area of 0.256 cm² and an open circuit voltage of 3.3. It was discharged under 4,700 ohms resistance for 16 hours, the voltage dropping gradually from 2.5 volts to 2.1 volts. Current density was 1.9 milliamps per cm².

The embodiments of the invention in which an exclusive property or privilege is claimed are defined as follows:

1. In a high energy density primary galvanic cell having a cathode containing cathodically active material, a light metal anode from Group IA or IIA of the Periodic Table, and a nonaqueous organic liquid electrolyte, the improvement in combination therewith which comprises,
   a cathode wherein the cathodically active material comprises $WO_x$, wherein x is between about 2.0 to 2.9.

2. A cell according to claim 1 wherein x is about 2.7.

3. A cell according to claim 1 wherein the cathodically active material comprises more than about 10% of $WO_x$, wherein x is between about 2.0 to 2.9.

4. A cell according to claim 3 wherein the cathodically active material comprises from about 50% to 100% of $WO_x$, wherein x is between about 2.0 to 2.9.

5. A cell according to claim 1 wherein the cathode contains, additionally, up to about 5% of a conductivity aid, based on the weight of the active material.

6. A cell according to claim 1 wherein the cathode contains, additionally, up to about 15% of a binder, based on the weight of the active material.

7. A cell according to claim 2 wherein the cathodically active material comprises more than about 10% of $WO_x$, wherein x is about 2.7.

8. A cell according to claim 7 wherein the cathodically active material comprises from about 50% to 100% of $WO_x$, wherein x is about 2.7.

9. A cell according to claim 2 wherein the cathode contains, additionally, up to about 5% of a conductivity aid, based on the weight of the active material.

10. A cell according to claim 2 wherein the cathode contains up to about 15% of a binder, based on the weight of the active material.

* * * * *